United States Patent Office 2,852,956
Patented Sept. 23, 1958

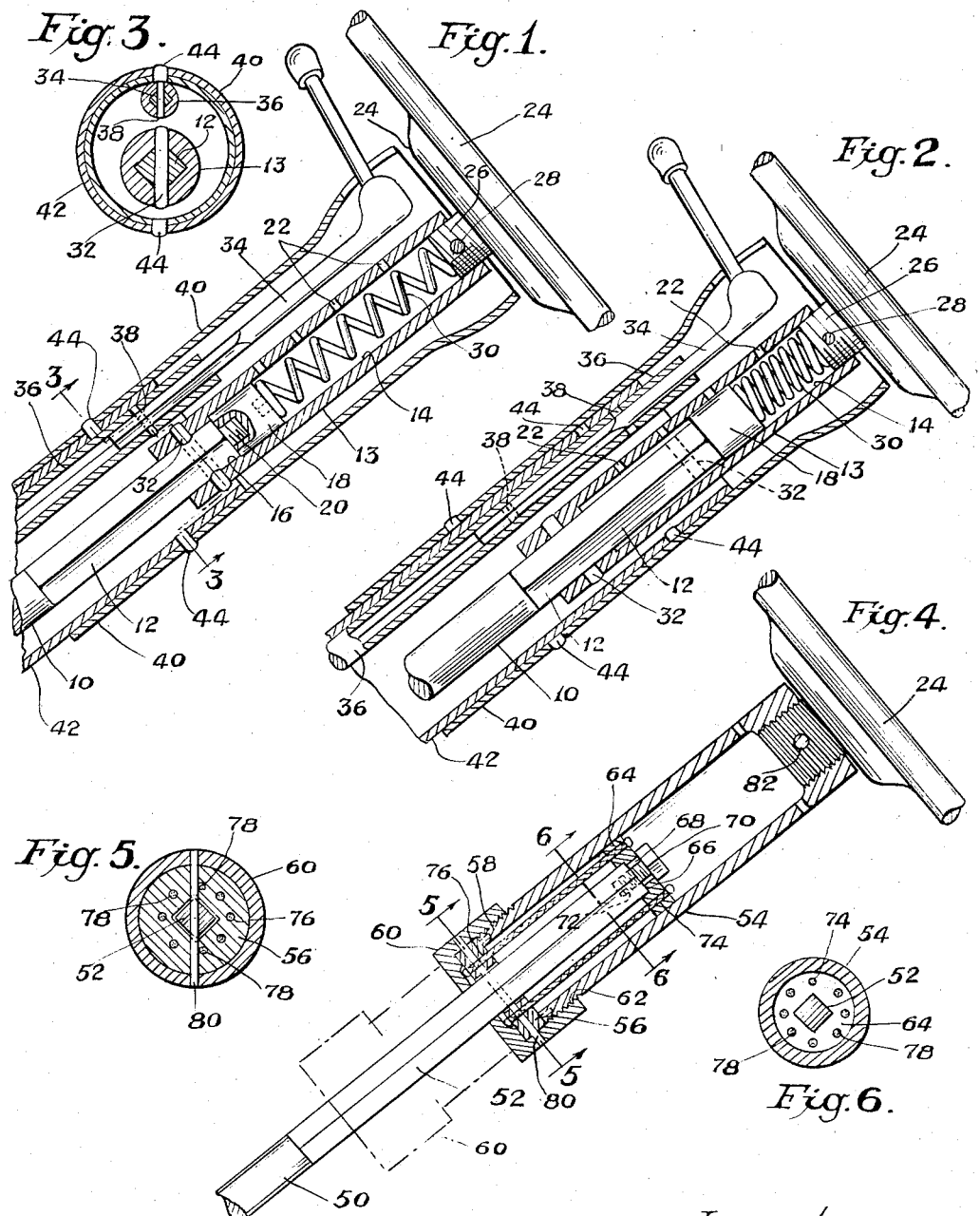

2,852,956

COLLAPSIBLE STEERING COLUMN

Naomi C. May, Philadelphia, Pa.

Application May 20, 1955, Serial No. 509,755

3 Claims. (Cl. 74—493)

The present invention relates generally to steering systems for automobiles and the like and it relates more particularly to automobile steering columns which will yield when subjected to excessive impact force so as to minimize the possibility of serious chest injury to the driver.

An object of the present invention is to provide a new and useful construction for an automobile steering column or the like which will minimize the possibility of serious chest injury to the driver by yielding under excessive impact force, such as created during a front-end collision. A further object is to provide a yieldable steering column of the character referred to, which will minimize the possibility of "backlash" (i. e. tendency to snap back quickly to its original extended position) such as might cause injury to the driver.

Other objects and advantages of the present invention are apparent in the following detailed description, appended claims and accompanying drawings.

It has long been recognized that one of the greatest dangers in any front-end automobile collision is the likelihood of serious chest injury to the driver resulting when the driver's momentum hurls him suddenly against the rigid and non-yielding conventional steering column and wheel assembly. While various proposals have heretofore been made to reduce this danger of injury, none has proven satisfactory or has met with commercial acceptance.

According to the present invention, there has been developed, for the first time, simple and inexpensive mechanism which will minimize the possibility of such serious chest injuries by enabling the steering column to yield when subjected to impact strength of the order generated during a front-end collision.

The present invention further contemplates novel mechanism which will bring the yielding movement of the steering column to a gradual halt and which will eliminate any tendency toward "backlash" (that is, the tendency for the steering column to return, with a snap, to its original extended position), which tendency, if unchecked, would hurl the driver violently backward, after the collision, with sufficient force to cause neck or back injuries.

For the purpose of illustrating this invention, there are shown in the accompanying drawings forms thereof which are presently preferred; it being understood, however, that this invention is not limited to the precise arrangements and instrumentalities illustrated.

Referring to the accompanying drawings in which like reference characters indicate like parts throughout:

Figure 1 is a longitudinal cross-sectional view of a steering column assembly forming one embodiment of the present invention, shown in normal extended position.

Figure 2 is a view like that of Fig. 1 but showing the telescoped position of the steering column, resulting from excessive impact.

Figure 3 is a transverse cross-sectional view taken generally along the line 3—3 of Fig. 1.

Figure 4 is a longitudinal cross-sectional view of another embodiment of the present invention; the extended position being shown in solid lines and the telescoped position being shown in dash-dot lines.

Figure 5 is a transverse cross-sectional view taken generally along the line 5—5 of Fig. 4.

Figure 6 is a transverse cross-sectional view taken generally along the line 6—6 of Fig. 4.

The embodiment of Figs. 1–3 includes a main steering column shaft 10, of which only the upper end is shown in the drawings. The lower end of the shaft 10 is connected, through appropriate linkages (not shown) to the front wheels of the automobile so that axial rotation of the column causes the front wheels to turn in a manner well known in the art and requiring no illustration or further explanation herein.

The upper end of the shaft 10 is provided with an axially elongated section 12 having square (or other non-circular) cross-sectional configuration.

Telescopically mounted upon the upper end of the shaft 10 is a generally tubular extension member 13. The extension member 13 has a cylindrical inner bore 14 extending from its uppermost free ends and terminating slightly above the lowermost end thereof. The extension member 13 is provided, at its lower end, with an axially extending opening 16 which has square (or other non-circular) configuration and which is adapted to fit slidably over the square section 12 of the main steering column shaft 10.

As shown particularly in Fig. 1, the cylindrical bore 14 of the extension member 13 has a diameter slightly greater than the maximum transverse dimension of the square section 12 and the square opening 16.

A cylindrical head 18 is screw-threadedly connected, as at 20, to the uppermost end of the shaft 10; the head 18 being constructed and arranged to move slidably within the cylindrical bore 14 and to form a generally airtight seal therewith.

A plurality (for example four) of relatively small axially spaced vent openings 22 are formed in the cylindrical bore 14 of the extension member 12, the purpose of which will be described hereinbelow.

A conventional steering wheel 24 is mounted upon the upper end of the extension member 13; the wheel 24 having a short cylindrical extension 26 which fits snugly into the upper end of the bore 14 and is securely, but detachably, fastened to the member 13 in any suitable manner, as for example by a diametrically disposed screw 28.

Disposed within the cylindrical bore 14 is a helical compression spring 30; the lower end of the spring 30 bearing against the circular end wall of the head 18 while the upper end of the spring bears against the inner end wall of the extension 26.

The shaft 10 and the extension member 13 are normally locked together in the extended relationship shown in Fig. 1 by means of a shear-pin 32 which passes diametrically through aligned openings formed in the lowermost end of the member 13 and the upper end of the square section 12, as indicated in Fig. 1.

The shear-pin 32 is so constructed that, normally, the shaft 10 and the extension member 13 are locked together to form a more or less integral unit of fixed overall axial dimension; square sections 12 and 16 serving to transmit the axial rotation of the steering wheel to the shaft 10 (which, in turn, causes turning of the automobile wheels in conventional manner).

However, should the automoblie have a front-end collision of sufficient intensity as to cause the driver to be hurled against the steering wheel 22 with momentum great enough to cause injury if the steering column were immovable and non-yielding, the force generated upon the shear-pin is great enough to snap the shear-pin and thereby to release the extension member 13 and permit it to move telescopically forward and downward over the shaft 10 in the manner indicated in Fig. 2. That is, the shear-pin is constructed to have the necessary predetermined strength to resist normal stresses (as for example the forward pressure of the driver's hands upon the steering wheel during operation of the automobile) but to yield under the excessive stress created during a front-end collision.

When the shear-pin 32 is fractured in the manner described above, the extension member 13 moves downward against the pressure of the compression spring 30 so as resiliently to take up the impact force resulting when the driver's body or head strikes the steering wheel.

As the downward and forward movement of the extension member 13 begins, the air inside the cylindrical bore 14 escapes through the several axially spaced vent openings 22; the combined area of all the vent openings being sufficient to permit free escape of the air within the bore 14.

However, as the forward and downward movement of the extension member 13 continues, it can be seen that the individual vent openings are progressively closed off by the cyclindrical head 18, as shown in Fig. 2. This progressively reduces the overall venting area and cuts down on the rate of escape of air from the bore 14.

As successive vent openings are closed off, the venting rate is correspondingly reduced and, as a result, the pressure of air within the bore 14 builds up to supplement and augment cushioning action of the compression spring 30. This aids in smoothly decelerating the forward axial movement of the extension member 13 and the steering wheel 24 and assists in bringing the extension member and the steering wheel to a smooth halt while safely taking up the driver's momentum.

The novel arrangement of the vent openings 22 offers the further advantage that it checks the normal tendency of the compressed spring 30 to snap back to its extended position. That is, if unchecked, the compression spring 30 would tend violently to return the extension member 13 and the steering wheel 24 from the forwardmost position of Fig. 2 to the position of Fig. 1 and, in so doing, would hurl the driver violently backward with a force sufficient to cause serious back or neck injuries.

However, with the novel vent hole arrangement, this return movement of the extension member 12 can proceed only as rapidly as air can flow back into the bore 14 through the vent holes.

Since, as indicated in Fig. 2, only a single vent hole remains uncovered when the extension member is in forwardmost position, the rate of return flow of air to the bore 14 is necessarily slow at the beginning of the backward movement of the member 13. While the extension member gradually increases its rate of return movement as successive vent openings are uncovered, the rate of return movement never becomes great enough to cause injury to the driver.

Following a front-end collision such as would cause shearing of the pin 32, the extension member 13 is returned to the extended position of Fig. 1 but is prevented from coming loose of the shaft 10 by reason of the fact that the diameter of the cylindrical head 18 is greater than the maximum diametric dimension of the shaft square section 12, as indicated in Fig. 1.

In certain makes of automobiles, the gear shift lever is mounted alongside of the steering column.

In order to overcome the resistance of the gear shift lever in this type of construction, I have, in Figs. 1 and 2, shown a telescopic arrangement of the lever. Thus, in Figs. 1 and 2, I have shown the upper member 34 of the gear shift arm connected to the lower member 36 thereof by a shear-pin 38; the members 36 and 38 being telescopically arranged with complementary non-circular surfaces which key them together for axial rotation. The shear-pin 38 is constructed and arranged to fracture under excessive force (of the order required to fracture the shear-pin 32 described above) so as to permit the upper member 34 to move forward from the position of Fig. 1 to the position of Fig. 2 in the case of a front-end collision.

In Figs. 1 and 2 I have also shown an outer housing sleeve encasing the steering column shaft and gear shift arm. The sleeve is composed of an upper section 40 telescopically mounted upon a fixed lower section 42; the sections 40 and 42 being connected by a pair of diametrically opposed shear-pins 44 which fracture under collision impact thereby permitting the upper sleeve section 40 to move forward from the position of Fig. 1 to the position of Fig. 2.

From the foregoing description it can be seen that the steering wheel, the upper extension member 12 of the steering column, the upper member 34 of the gear shift arm and the upper section 40 of the housing sleeve are all free to move forward so as to yield under excessive impact, thereby preventing injury to the driver.

The extent of forward movement can be varied depending upon the circumstances. However, I have found that, in most cases, a forward movement of about four to eight inches, and preferably of the order of six inches, affords adequate protection against injury to the driver.

Following a front-end collision, the various shear-pins 32, 38 and 44 are replaced, whereupon the steering column assembly is restored to usefulness.

In Figs. 4–6, there is shown another embodiment of the present invention wherein filaments or strands of undrawn nylon or other synthetic resin, having the property of inelastic elongation, are used to absorb the energy generated during the forward telescopic movement of the steering column shaft extension.

Thus, as is known in the art, undrawn nylon, in the form of a filament or strand, is capable of elongating inelastically so as to absorb energy, without any tendency to snap back or recoil.

In the embodiments of Figs. 4–6, I may provide a main steering column shaft 50 having a square (or other non-circular) cross-sectional configuration 52 formed along its upper portion. A generally tubular telescopic extension member 54 fits over and encloses the upper end of the shaft 52 in a manner to be more fully described hereinbelow.

A ring 56 is mounted at the lower forward end of the extension member 54; the ring 56 having a square (or other non-circular) central opening which fits over and slides along the square portion 52 of the steering shaft 50 as indicated in Figs. 4 and 5. The ring 56 has a plurality of circumferentially spaced axially-extending projections 58 which fit into corresponding openings formed in the peripheral end wall of the extension member 54.

The ring 56 is held in place against the end wall of the member 54 by a cup-shaped apertured collar 60 which is screw-threadedly connected, as at 62, to the outer cylindrical wall of the member 54.

Mounted upon the uppermost free end of the shaft 50 is an enlarged head 64 which has a cylindrical outer surface adapted to fit slidably within the bore of the tubular extension member 54. The head 64 is provided with a square (or other non-circular) recess 66 which fits over the end of the square shaft section 52. The head 64 also has a central axial opening 68 formed therein. A screw-threaded bolt 70 is adapted to extend through the opening 68 and to make detachable engagement within a correspondingly threaded axial opening 72 formed at the upper end of the shaft 50.

It can be seen that, by seating the bolt 70 within the threaded opening 72 of the shaft 50, it is possible to lock the head 64 securely and non-rotatably upon the square-section upper end of the shaft. The head 64 is provided with a plurality of axial openings 74 spaced circumferentially about the central opening 68 thereof.

The ring 56 mentioned above is provided with a corresponding number of axial openings 76 spaced circumferentially about its square central opening.

As shown in Figs. 4 and 6, the ring 56 is connected to the head 64 by a plurality of circumferentially spaced axially extending filaments or threads 78 of undrawn nylon, the ends of which pass through the openings 74 and 76 and are knotted or otherwise suitably anchored so as to keep from pulling loose.

A shear-pin 80 extends diametrically through aligned openings in the collar 60, the ring 56 and the square-section 52 of the steering shaft 50 as indicated in Figs. 4 and 5.

Normally, the shear-pin 80 locks the extension member 54 to the main shaft 50 so as to prevent relative axial movement thereof. The steering wheel 24 is secured to the upper end of the extension member 54 by a bolt 82, as indicated in Fig. 4. It can be seen that rotation of the steering wheel causes axial rotation of the extension member and this, in turn, causes axial rotation of the main shaft, by reason of the square configuration of the shaft section 52 and the corresponding square configuration of the central opening of the ring 56.

The strength of the shear-pin 80 is such that it will resist normal stresses encountered during operation of the steering wheel. However, the excessive stress generated during a front-end collision will cause the shear-pin to fracture and will permit the steering wheel and the extension member 54 to move forward from the solid line position of Fig. 4 to the dash-dot line position. This forward movement of the extension member 54 will cause the undrawn nylon filaments 78 to elongate inelastically.

As mentioned above, this inelastic elongation of the undrawn nylon filaments takes up the energy of momentum and gradually decelerates the forward movement of the steering wheel and extension member so as to bring them to a smooth and even stop at the dash-dot line position of Fig. 4.

In this way, the steering wheel and column will yield under excessive impact and will thereby prevent serious injury to the body or head of the driver.

Since the elongation of the undrawn nylon filaments is inelastic, there is no tendency to snap back or recoil such as would be encountered with an unchecked resilient spring member.

Preferably the ring 56, the head 64 and the connecting undrawn nylon filament 78 are pre-assembled as a more or less integral unit. After a collision such as causes inelastic elongation of the nylon filament 78, the entire assembly of ring 56, head 64 and filament 78 are removed and replaced by a new assembly. Of course, the shear-pin 80 is also replaced following a collision.

The present invention may be embodied in other specific forms and, therefore, the foregoing embodiments are to be considered in all respects as illustrative and not restrictive, reference being made to the appended claims as indicating the scope of this invention.

Having thus described my invention, I claim as new and desire to protect by Letters Patent the following:

1. A collapsible steering column assembly for automobiles and the like comprising a rotatably mounted shaft, a co-axial extension member telescopically mounted on the upper end of the shaft and keyed for axial rotation with the shaft, a steering wheel secured to the upper free end of the extension member, a locking element connecting said shaft and said extension member and normally maintaining said extension member in axially extended position relative to the shaft, said locking element being constructed and arranged to disconnect under sudden and excessive impact so as to free the extension member for inward axial movement to retracted position along the shaft, and means for gradually checking the inward axial movement of the extension member whereby the inwardly moving extension is smoothly decelerated and brought to a halt without any sudden recoil, said checking means comprising a length of undrawn nylon axially connecting the adjoining ends of the shaft and the extension member, said undrawn nylon elongating inelastically so as gradually to absorb the energy of the inwardly moving extension member.

2. A construction according to claim 1 wherein the checking means comprise a length of undrawn nylon axially connecting the adjoining ends of the shaft and the extension member, said undrawn nylon elongating inelastically so as gradually to absorb the energy of the inwardly moving extension member.

3. A construction according to claim 2 wherein the adjoining ends of the shaft and the extension member are connected by a plurality of circumferentially spaced strands of undrawn nylon.

References Cited in the file of this patent

UNITED STATES PATENTS

| | | |
|---|---|---|
| 1,295,065 | Riley et al. | Feb. 18, 1919 |
| 2,028,953 | Roark | Jan. 28, 1936 |
| 2,227,821 | Burrell | Jan. 17, 1941 |
| 2,639,626 | Snyder | May 26, 1953 |

FOREIGN PATENTS

| | | |
|---|---|---|
| 458,542 | Italy | July 20, 1950 |